July 5, 1927.

C. W. TYSON 1,634,966

SHOCKER ATTACHMENT

Filed Dec. 30, 1925

Inventor
C. W. Tyson

By Philip W. H. Finell
Attorney

July 5, 1927.

C. W. TYSON 1,634,966

SHOCKER ATTACHMENT

Filed Dec. 30, 1925

Inventor
C. W. Tyson
By Philip A. Howell
Attorney

Patented July 5, 1927.

1,634,966

UNITED STATES PATENT OFFICE.

CALVIN W. TYSON, OF PRAIRIE DEPOT, OHIO.

SHOCKER ATTACHMENT.

Application filed December 30, 1925. Serial No. 78,368.

The invention relates to shocker attachments for corn binders, and has for its object to provide a device of this character comprising a substantially horizontally disposed segmentally shaped track and a cradle pivotally mounted at its inner end on a pivot point located at the center of the arc of the track and the outer end of the cradle hingedly mounted, and also slidably mounted on the track, said pivotal and hinging and slidable mounting allows the cradle to be shifted to various positions on the track around the pivotal point for dumping the contents thereof at any predetermined point.

A further object is to provide a support having a pivot pin, which pivot pin is received in an aperture of the plate carried by the inner end of the cradle, thereby allowing the cradle to be easily tilted upwardly at its forward end, after it is positioned in any predetermined position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
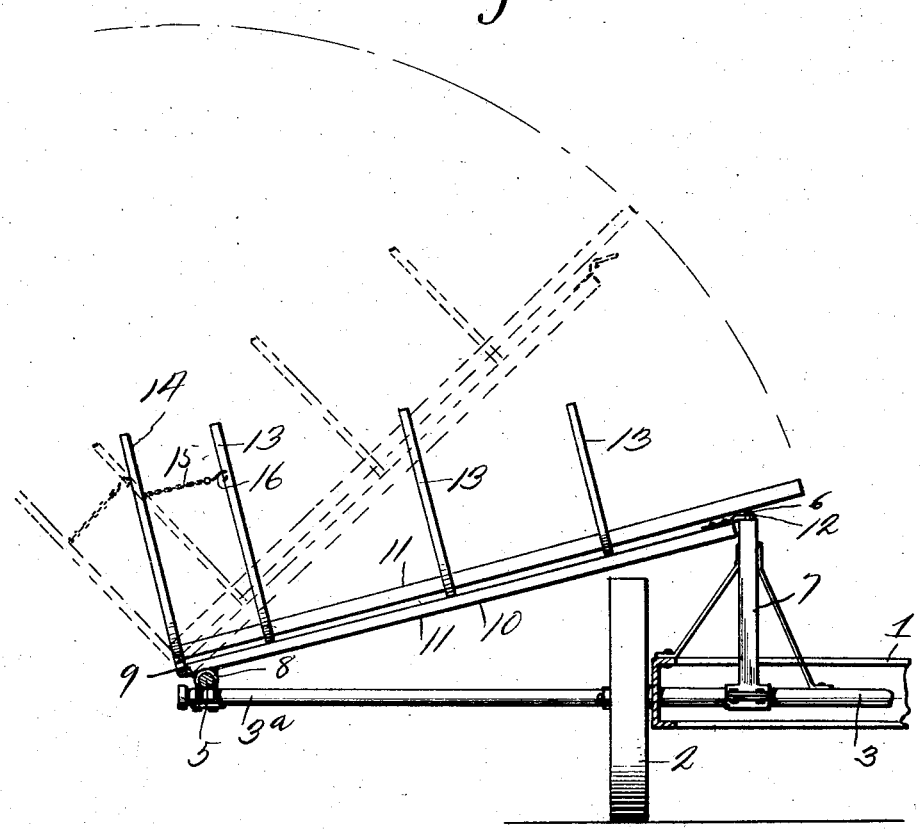
Figure 1 is a vertical transverse sectional view through the guide bar, showing the cradle in rear elevation.
Figure 2:
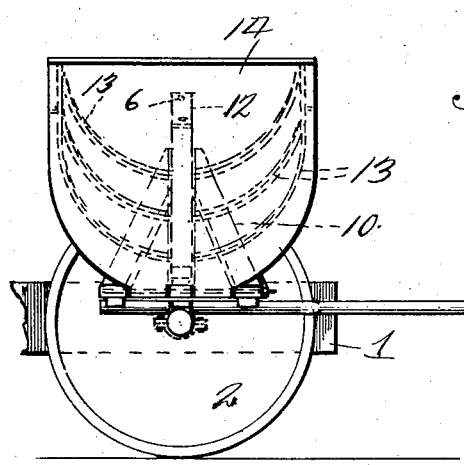
Figure 2 is a side elevation of a portion of a corn binder showing the cradle attachment.
Figure 3:
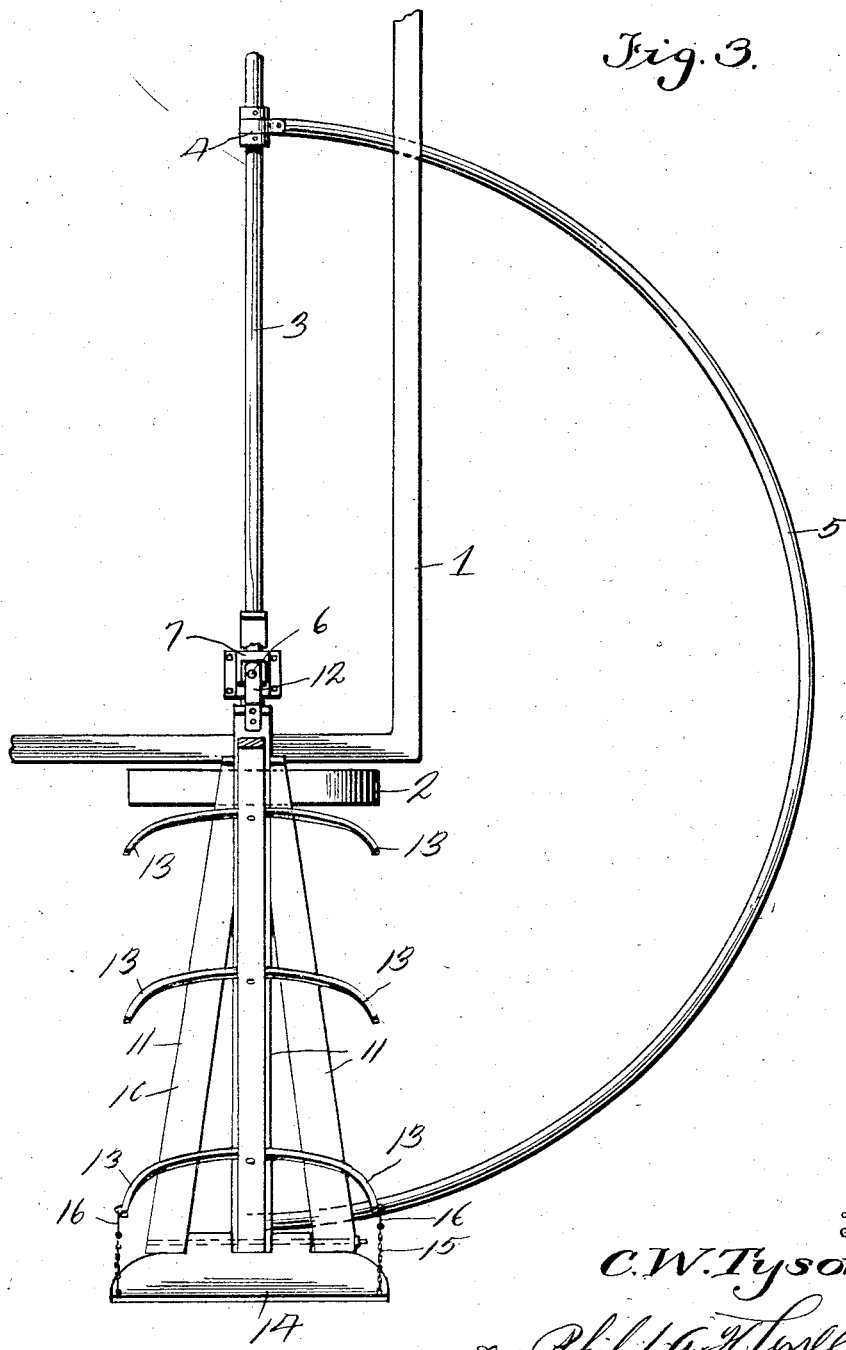
Figure 3 is a top plan view of the cradle.

Referring to the drawing, the numeral 1 designates a portion of the frame of a conventional form of corn harvester and 2 one of the supporting wheels thereof. The supporting wheel 2 is mounted on a conventional form of axle 3 in the usual manner. Secured to the axle 3 at 4 is a horizontally disposed arcuately shaped track 5, which track is on an arc having its center at a pivotal pin 6, which pivotal pin is carried by the upper end of a vertically disposed bracket 7 mounted on the axle 3. It is to be understood, however, the bracket 7 and the segmental guide rod 5 may be supported in any suitable manner. The outer end of the guide rod 5 is disposed outside of the wheel 2, and is supported by the outer end 3ª of the axle 3. However it may be supported in any suitable manner.

Slidably connected at 8 on the segmentally shaped guide 5 is the outer end 9 of a tiltable cradle 10. The cradle 10 comprises a plurality of outwardly diverging bars 11, the center bar of which is pivotally connected as well as slidably connected at 8 to the guide track 5. The center bar 11 terminates in an apertured plate 12, in the aperture of which the pivot pin 6 is received. It will be seen that the operator may easily shift or adjust the cradle 10 to various radial positions in relation to the pivot pin 6, according to the position it is desired to dump the accumulated corn stalks in the cradle, therefore it will be seen, it will only be necessary for the operator to move the cradle to the desired position for dumping the same. The center bar 11 is provided with outwardly and upwardly extending arms 13, in which arms the corn stalks are gathered. The outer arms 13 are detachably connected to a pivoted bottom 14 in the cradle by means of chains 15 and the hooks 16 carried by the chains. After the cradle is properly positioned for discharging its load, the operator detaches the hooks 16 which allows the pivoted bottoms 14 to tilt downwardly, and then the operator grasps the inner end of the cradle and forces the same upwardly, therefore the full load of the cradle is deposited on the ground, and it will be seen that the shock of corn stalks may be bound together in the cradle before discharging if desired or bound together after the same is deposited on the ground.

From the above it will be seen that a cradle attachment is provided for corn binders, which attachment is simple in construction, may be easily applied to a conventional form of binder without materially varying the construction thereof, and the device may be easily handled by a single man, thereby reducing the cost of operation to a minimum.

The invention having been set forth what is claimed as new and useful is:—

1. The combination with a corn harvester frame corner, a wheel adjacent said corner, an axle for said wheel, an arm extending outwardly from said axle outside of the wheel, of a tiltable and arcuately movable stalk cradle, an arcuate track connected to the axle extension and arching the corner of the frame, one end of said cradle being movable on said track, a support extending to a position above the wheel, the other end of said cradle being pivotally and detachably connected to said support and movable to a position over the wheel.

2. The combination with a corn harvester frame corner, an axle adjacent said corner, a wheel carried by said axle, a track arching said corner and terminating spaced from the outer side of the wheel, of a stalk cradle, said cradle having one of its ends slidably and hingedly mounted on the track, a support adjacent the inner side of the wheel and terminating above the wheel, the other end of said cradle being pivotally and detachably connected to said support and movable to a position above the wheel.

In testimony whereof I hereunto affix my signature.

CALVIN W. TYSON.